May 21, 1957

J. C. SIMS, JR., ET AL
METHOD AND APPARATUS FOR PREPARING
A LATENT MAGNETIC IMAGE 2,793,135

Filed Dec. 1, 1955

2 Sheets-Sheet 1

INVENTORS
JOHN C. SIMS, JR.
CLYDE A. NORTON
BY
Charles C. English
AGENT

May 21, 1957 J. C. SIMS, JR., ET AL 2,793,135

METHOD AND APPARATUS FOR PREPARING A LATENT MAGNETIC IMAGE

Filed Dec. 1, 1955 2 Sheets-Sheet 2

INVENTORS
JOHN C. SIMS, JR.
CLYDE A. NORTON
BY
Charles C. English
AGENT

United States Patent Office 2,793,135
Patented May 21, 1957

2,793,135

METHOD AND APPARATUS FOR PREPARING A LATENT MAGNETIC IMAGE

John C. Sims, Jr., Springhouse, Pa., and Clyde A. Norton, Greenwich, Conn., assignors to Sperry Rand Corporation, New York, N. Y., a corporation of Delaware Application December 1, 1955, Serial No. 550,322
27 Claims. (Cl. 117—17.5)

The present invention relates to printing techniques and is more particularly concerned with an improved printer utilizing magnetic principles.

A number of printers are known in the prior art which employ various magnetic concepts in the preparation of printing surfaces and in the printing of information therefrom. Reference is made to the copending application of John Presper Eckert, Jr. and J. C. Sims, Jr., Serial No. 221,362, filed April 17, 1951 for "Method and Apparatus for Magnetic Printing"; and to the copending application of John Presper Eckert, Jr. and John C. Sims, Jr., Serial No. 333,574, filed January 27, 1953, for "High Speed Printer." Each of these applications has been assigned to the assignee of the instant application, and they disclose apparatus and techniques whereby such magnetic principles may be employed in printing applications.

In general, printers of the type disclosed in the above identified copending applications, produce a selected pattern of magnetic gradients on the surface of a body such as a magnetic drum, by photoscanning a sheet of material to be reproduced, thereby to derive a series of electrical signals representative of information appearing on the said sheet; and by thereafter using the said electrical signals to drive magnetic transducers scanning the magnetic printing surface. The information pattern of magnetic gradients so produced may then be coated with paramagnetic particles, such as powders of iron, nickel or cobalt, whereby the said paramagnetic particles are selectively retained on the printing surface in accordance with the pattern of magnetic gradients previously placed thereon; and the said paramagnetic particles act as a powdered ink having magnetic properties whereby print transfers can thereafter be effected, for instance to a sheet of paper.

Magnetic printers of the types described above, as well as other printers known in the art, are characterized by the requirement that copy to be reproduced must be scanned, for the derivation of signals or the like, before a total image of the intelligence to be reproduced can be effected, again by a scanning operation. This requirement of scanning results in a relatively complex and costly printing apparatus; and in addition, necessitates a relatively long time interval for the preparation of a master print plate.

The present invention serves to obviate these difficulties by eliminating the necessity of scanning in magnetic printing applications and, in accordance with certain embodiments to be described, relies upon a novel concept of selectively demagnetizing, for instance by heat, portions of a substantially uniformly magnetized magnetic printing plate in accordance with intelligence to be reproduced. When such a selective demagnetization technique is employed, an overall magnetic printing surface may be caused to store a latent image corresponding to intelligence to be reproduced by the simple technique of applying predetermined heat gradients to portions of that magnetic surface without the necessity of scanning elemental areas of copy. In accordance with other embodiments of the present invention, the aforementioned heat gradients can be utilized to control a selective magnetization, rather than demagnetization of a printing surface, whereby a positive rather than negative latent image is produced.

It is accordingly an object of the present invention to provide an improved printer.

Another object of the present invention resides in the provision of an improved method and apparatus for effecting magnetic printing.

A still further object of the present invention resides in the provision of an improved printer adapted for high speed reproduction of symbolic and pictorial representations.

Still another object of the present invention resides in the provision of an improved magnetic printer which does not require the scanning of copy to be reproduced.

A still further object of the present invention resides in the provision of an improved magnetic printer relying upon the concept of selective magnetization or demagnetization of a printing surface for the production of a latent image to be employed in reproduction techniques.

Another object of the present invention resides in the provision of a new and improved apparatus for printing, having high operational efficiency and simplified construction.

A still further object of the present invention resides in the provision of a new and improved printing apparatus which is inexpensive to construct and which has low maintenance cost.

In accomplishing the above objects and advantages as well as other objects and advantages which will subsequently appear, certain embodiments of the present invention rely upon a technique of selective demagnetization of a magnetic printing surface. Thus, a printing surface such as a drum or plate may be coated with a magnetic substance having the properties of some of the ferrites, that is the magnetic coating has a relatively low Curie point but is still magnetically "hard." Such a surface is then substantially uniformly magnetized, for instance by exposing the said surface to the magnetic field of a master plate. The magnetized printing plate so prepared is then selectively demagnetized by projecting heat, through copy to be reproduced, onto the magnetized printing plate.

It will be appreciated that once a magnetic substance is heated beyond its Curie point, its magnetic properties are suppressed; and this suppression occurs quite suddenly as the Curie point of the material is reached and exceeded. Thus, by projecting heat through the copy to be reproduced onto the relatively low Curie point material, the magnetized surface is caused to be subjected to a pattern of heat gradients corresponding to the image to be reproduced whereby portions of the magnetic printing plate will be driven beyond the Curie point of the material thereby to become demagnetized; while other portions of the magnetized printing plate will not be so driven beyond the Curie point of the material and will retain their magnetism. A selectively demagnetized printing surface, prepared by this technique, can then be coated with a magnetic ink, for instance of one of the types mentioned previously, whereby the said magnetic ink will be retained on the printing surface at those portions still magnetized.

If a sufficiently low Curie point material is employed, the above described selective demagnetization by heat can be effected with ordinary copy material, such as paper. Under some circumstances, it will be appreciated that the necessary heat required to drive portions of the magnetic printing plate beyond its Curie point may be in excess of the kindling temperature of the copy. While this consideration may be met by the utilization of copy material having a relatively high kindling temperature, the present invention utilizes the further concepts of biasing the magnetized printing surface to a point where a relatively small heat gradient can accomplish the desired selective demagnetization; and this bias consideration permits substantially conventional copy materials, such as paper, to be employed in the printer.

The biasing can be accomplished in at least two ways in accordance with the present invention. Thus, the magnetized printing surface may be initially heated to a temperature slightly below the Curie point of the material comprising the printing plate, whereby the addition of further relatively small amounts of heat to portions of the said printing plate will cause those portions to be driven beyond the Curie point of the said magnetic material. In accordance with a further form of the present invention, the biasing may be accomplished by subjecting the magnetic printing plate to an erasing field of a magnitude insufficient to accomplish erasing at normal room temperature, whereby once more, the selective application of heat to portions of the printing plate will so lower the coercive points of those portions that the heated portions will be erased by the applied A. C. field, while the other portions, not so heated, will retain their magnetism.

The foregoing objects, advantages, construction and operation of the present invention will become more readily apparent from the following description and accompanying drawings, in which.

Figure 1A:
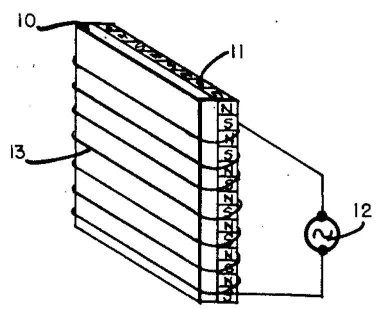
Figures 1A and 1B depict possible techniques for uniformly magnetizing a printing plate in accordance with an initial step of the printing method to be described.

Referring now to Figure 1A, it will be seen that, as discussed previously, a magnetic printing surface 10 may be initially impressed with substantially uniform magnetization by causing the said printing surface or plate 10 to be placed in contact with a magnetized master plate 11, under the influence of an A. C. field supplied by a source 12 in combination with a coil 13. The printing plate 10 may comprise a solid plate of a magnetic material having a relatively low Curie point, or may in the alternative take the form of either a magnetic or non-magnetic plate bearing a coating of such low Curie point material. A number of materials are known which exhibit Curie points sufficiently low for utilization in the present invention. A preferred material, however, comprises stainless steel, for instance 18–8 stainless steel rolled to about 200,000 tensile, which has a Curie point of about 300° F. A further material which may be employed in the practice of the present invention comprises the cobalt-nickel alloys of the type described, for instance, in Bonn and Wendel Patent No. 2,644,787, which alloys have Curie points of about 600° F. In addition, the magnetic printing surface may comprise a coating of either red or black iron oxide, and such iron oxide dispersions are particularly suitable since they are highly absorbent to thermal radiation.

By providing a magnetic surface comprising, for instance, one of the above discussed material, the surface may be uniformly magnetized and may thereafter be selectively demagnetized under the influence of heat applied to the surface in a desired pattern of heat gradients. In the particular example shown in Figure 1A, which illustrates one form of structure which may be employed for such uniform magnetization of a printing surface 10 subsequently to be employed in a printing application, the master printing plate 11 is formed of a plurality of small magnets, as illustrated, or may in the alternative have magnetic charges screened or scanned over its surface. The master plate 11 should be magnetically stronger than the plate 10 which is to be magnetized; and in the Figure 1A the said surface 11 is substantially planar. By placing printing plate 10 in contact with the surface 11 and by thereafter subjecting the two to an A. C. field, as illustrated, magnetic charges will be impressed substantially uniformly in the magnetic surface of printing plate 10 and these magnetic charges represent some known function of the sum of the charges on the master plate 11, and the field provided by elements 12 and 13.

Figure 5:
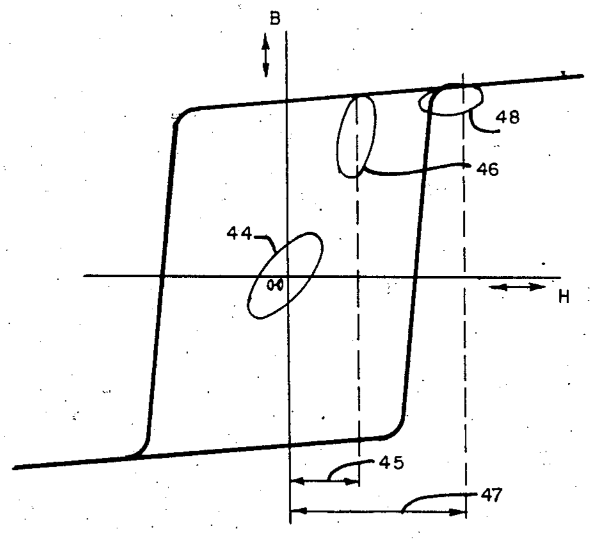
Figure 5 is a hysteresis loop illustrative of the premagnetization technique of Figure 1A.

The operation of the above magnetization process (Figure 1A) can best be understood by reference to the hysteresis loop of Figure 5. The plate 10 is composed of magnetic material exhibiting the relationship of magnetization (B) in response to applied magnetic force (H) illustrated by this hysteresis loop. The applied A. C. field acting alone on the material of the plate 10 causes it to move around a minor loop 44 which is ineffective in magnetizing the material. If a small magnetic bias is applied, for example the bias 45, the minor loop of operation is transferred to the position 46 which is also ineffective in magnetizing the material of the plate 10 since, when the fields are removed, the material comprising plate 10 will return to the O—O point of the B—H diagram. On the other hand, if the applied bias field should be increased to the value 47, the A. C. field will operate in the region 48, which is at saturation, whereby the combination of bias and A. C. field causes permanent magnetization of the material. Upon subsequent removal of the fields, the material will remain magnetized in a positive sense. If the applied field is negative, the residual magnetization will be negative. The hysteresis loop of Figure 5 is shown as ideally rectangular, for purposes of explanation. Practical materials, although not usually obtainable with such sharply defined saturation points, nevertheless are sufficiently similar in characteristics to that of Figure 5 so that operation in the manner described is observed.

Figure 1B:
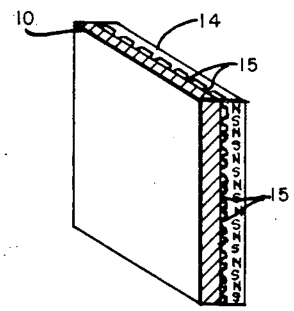

In the alternative, rather than employing the system of Figure 1A, an initial magnetization step of the type illustrated in Figure 1B may be employed, and this latter magnetization technique eliminates the necessity of providing a separate A. C. field. Once more, a magnetic printing plate 10 is substantially uniformly magnetized by being placed in contact with a magnetized master plate 14; but in the example of Figure 1B the master plate 14, rather than having a smooth surface, defines a plurality of small peak-like protrusions such as 15; and each protrusion is disposed adjacent a magnetic pole in the master plate 14. The protrusions 15 thus concentrate the flux of the magnetic poles produced by master plate 14 whereby contiguity between the printing plate 10 and the protrusions 15 of master plate 14 cause the said plate 10 to be charged with a plurality of small positive and negative poles, substantially uniformly disposed over the entire surface of plate 10. As before, the master plate 14 should be magnetically stronger than the plate 10 to be charged; but, by employing the configuration of the plate shown in Figure 1B, the separate A. C. field, utilized in the embodiment of Figure 1A, may be eliminated.

In practice, a magnetic printer of the type contemplated by the present invention, preferably employs one of the techniques described in reference to Figures 1A or 1B for initially charging the magnetic printing plate. The printing plate so magnetized is then selectively demagnetized under the influence of a pattern of heat gradients applied thereto; and this pattern of heat gradients may be provided by projecting heat, for instance from an infra-red lamp, through copy to be reproduced, onto the magnetized printing surface. If the copy comprises a material having a kindling temperature higher than the Curie point of the magnetic material, the described projection of heat may be accomplished without further refinement in the system. In order to permit the use of magnetic materials having Curie points somewhat higher than the kindling temperatures of substantially conventional copy-bearing materials such as paper, the uniformly magnetized printing plate may be biased by either a heating or erasing technique to a point whereby substantially small heat gradients accomplish the desired selective demagnetization.

Figure 2:
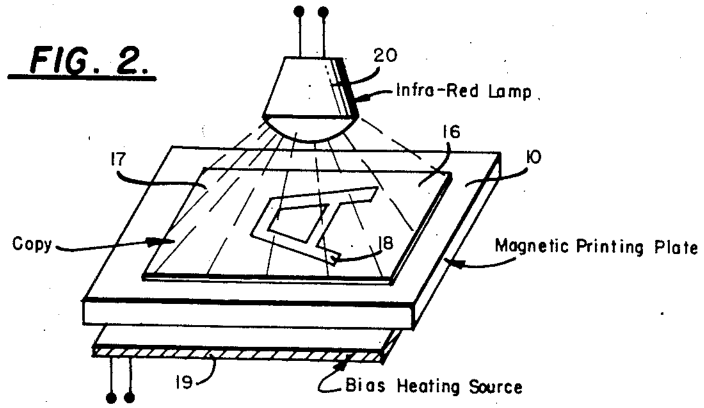
Figure 2 illustrates the preparation of a magnetic image-bearing surface in accordance with one embodiment of the present invention.

Referring to Figure 2, it will be seen that one technique in accordance with the present invention, utilizes a thermal bias arrangement. Thus, as illustrated in Figure 2, a magnetic printing plate 10, which is uniformly premagnetized by one of the techniques already described in reference to Figures 1A and 1B, may have copy 16 superimposed thereon; and this copy may comprise paper, for instance, having unprinted areas such as 17 and printed areas 18, the latter being symbolically represented by the letter "A." The printing plate 10 may be raised initially to a temperature just below its Curie point by placing it on a hot plate 19, or by otherwise heating the said plate, for instance by a bias irradiation from a separate source of infra-red. Further heat may thereafter be impressed upon the plate 10, for instance by flashing an infra-red lamp 20 disposed as shown with reference to the copy 16 and the plate 10. The additional heat thus supplied by infra-red lamp 20, or by whatever other source of auxiliary heat may be employed, is projected onto the surface of printing plate 10 through copy 16.

The unprinted portions 17 of copy 16 permit the ready passage of heat from lamp 20 through the said copy; while the printed portions 18 of the said copy 16 absorb or otherwise prevent the passage of such heat from lamp 20. Those portions of plate 10 which underlie unprinted portions of copy 16 are thus raised to a temperature in excess of other portions of plate 10 which underlie printing on copy 16. Due to the bias provided by source 19, the additional heat gradients provided by lamp 20, under the control of copy 16, cause portions of plate 10 which underlie unprinted portions of copy 16, to become demagnetized while those portions of plate 10 which are adjacent printing on copy 16 remain magnetized. Thus, the pattern of heat gradients provided by heat source 20 through copy 16 is reproduced as a pattern of magnetic gradients on the surface of magnetic printing plate 10; and these magnetic gradients may thereafter be coated with a magnetic ink to permit the desired print transfers.

Figure 3:
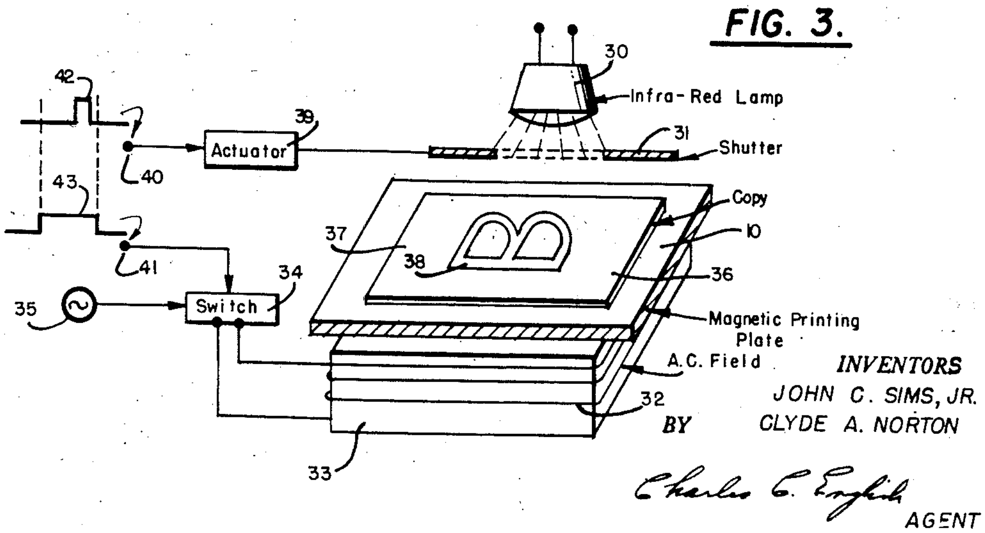
Figure 3 illustrates the preparation of a magnetic printing surface in accordance with a further embodiment of the present invention.

A second method of selective demagnetization of the uniformly magnetized magnetic printing plate is illustrated in Figure 3; and this latter form of the invention relies upon a concept of magnetic bias rather than the thermal bias discussed in reference to Figure 2. Thus, referring to Figure 3, it will be seen that, as before, a magnetic printing plate 10, uniformly magnetized by one of the techniques discussed in reference to Figures 1A and 1B, may be exposed selectively to a heat source such as an infra-red lamp 30 via a shutter 31; and may be further exposed selectively to an A. C. erasing field provided, for instance, by a coil 32 carried by a support 33 and selectively energized via a switch 34 from an A. C. source 35. The magnitude of the A. C. field provided by source 35 and coil 32 is so chosen that it does not exceed the coercive force of the magnetic material comprising plate 10 at ordinary room temperatures, or at whatever other desired reference temperature may be selected. Thus, in the absence of other circumstances, the uniformly magnetized plate 10 will remain magnetized, for instance at room temperature, notwithstanding the application of the A. C. field provided by coil 32.

It will be appreciated that as magnetic materials are raised in temperature, even in ranges well below the Curie point of the particular magnetic material employed, the coercive force of the said magnetic material correspondingly decreases. Thus, a pattern of heat gradients impressed upon the magnetic printing plate 10 may be such that the coercive force of certain portions of the material is reduced to a point sufficient to permit erasing of those portions under the influence of the A. C. field, while other portions of the magnetic material, which are not so heated, will remain unerased. In the particular example illustrated in Figure 3, the pattern of heat gradients discussed is provided by projecting heat, for instance from the infra-red lamp 30 via the shutter 31, and thence via a copy 36 onto the surface of magnetic printing plate 10. Those portions of plate 10 which underlie unprinted areas 37 of the copy 36 will be heated to a higher temperature than other portions of the said plate 10 which underlie printed areas 38, since the copy 36 is largely transparent to infra-red radiation in the unprinted portions. As a result, the A. C. field supplied by coil 32 will erase the magnetization of plate 10 at those areas adjacent unprinted areas 37 of copy 36 while other areas of the printing plate 10 adjacent printed areas 38 of copy 36 will remain magnetized. As before, therefore, the application of a pattern of heat gradients, under the control of the printed copy to be reproduced, effects a pattern of magnetic gradients on the printing plate corresponding to that copy; and magnetic inks may again be employed thereafter to effect desired print transfers.

It will be appreciated that in the embodiment shown in Figure 3, certain undesirable results may occur if the A. C. field is permitted to remain active for a long period after the thermal image is established, for, in such an event, the A. C. field could continue to erase as the thermal image decays by spreading, conductionwise, over the surface of plate 10. This undesirable characteristic, which would result in fuzzy prints with loss of edge definition, can be readily avoided, however, by assuring that the A. C. field is active only during limited periods of time when the thermal image is very sharp, and such control of the A. C. field may be accomplished through the provision of the aforementioned switch 34 and an actuator 39, under the control of signals applied to terminals 40 and 41.

In a practical embodiment of the present invention, therefore, the A. C. field is applied to printing plate 10 as a first step; the printing plate is thereafter exposed to the heat source 30 as a second step; and the A. C. field is then removed, substantially simultaneous with or immediately subsequent to the removal of the heat exposure. This action is illustrated in Figure 3 by the provision of control signals 42 and 43 applied respectively to terminals 40 and 41; and by using such signals, the actuator 39 will cause shutter 31 to open for a relatively brief interval commencing subsequent to energization of the A. C. field, and terminating substantially simultaneous with or immediately prior to removal of the said A. C. field.

It will be appreciated that considerations similar to those discussed in reference to the magnetic bias control of Figure 3 apply to the thermal bias embodiment of Figure 2; and while the magnetic bias provisions of the present invention permit more ready control of the printing conditions than is the case in a thermal bias application, certain of these considerations may be effected in the embodiment of Figure 2, for instance by providing shutters of heat-opaque material between the plate 10 and the bias heating source 19 as well as between the plate 10 and the auxiliary heating source 20 of Figure 2.

Figure 4:
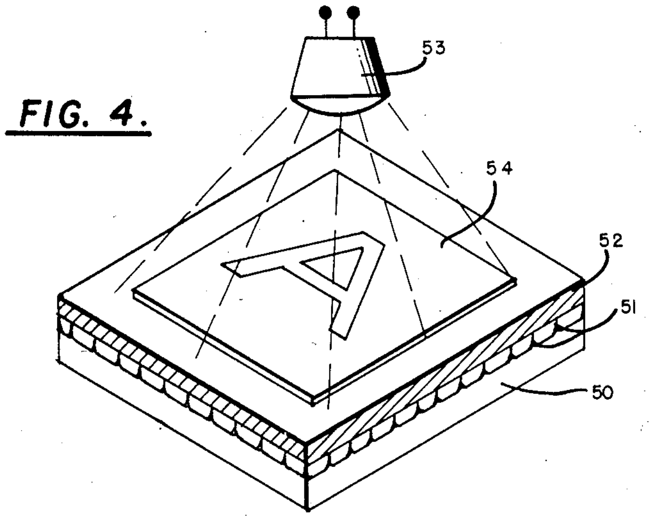
Figure 4 illustrates the preparation of a magnetic printing surface in accordance with still another embodiment of the present invention.

In accordance with a still further embodiment of the present invention, illustrated in Figure 4, the master printing plate need not be uniformly pre-magnetized, but may be exposed to a master plate having a field of insufficient strength to magnetize the printing plate under ordinary circumstances. While so magnetically exposed, the printing plate may be further exposed to a heat source applied selectively to the printing plate via copy to be reproduced whereby the combined action of selective heat and magnetic bias effects a selective magnetization, rather than demagnetization, of the printing plate.

Thus, referring to Figure 4, which is in large part similar to Figure 1B, a support plate 50 of hard magnetic material having a plurality of projections 51, is physically disposed in contact with the plate 52. In this embodiment the printing plate 52 should comprise a thin sheet of material so that the magnetic fields emanating from the points 51 will not fringe excessively through the thickness of the printing plate 52.

The strength of the magnetic fields emanating from the points 51 should, at room temperature, be insufficient to overcome the coercive force of the material comprising the plate 52. On the other hand, the projection of a thermal image on the opposite face of the plate 52 from heat source 53 via copy 54 should sufficiently lower the coercive force of the material of the plate 52 so that magnetization by the fields of the plate 50 will allow a latent image to form. Such an arrangement requires careful selection of materials so that operation in the desired range of magnetic field strength and thermal image strength is obtained. The plate 50 could, for example, be made of Alnico V and the concentrated flux developed between points 51 might apply a coercive force of for example 400 oersteds. If the printing plate 52 were then made of a material having a rectangular hysteresis loop and a coercive force of 450 oersteds at a low temperature, and a coercive force below 400 oersteds at a high temperature, for example, 150° F., then creation of a latent image in the plate 52 will be effected by the projected thermal image. There are a number of magnetic materials having magnetic properties of this general character and the examples already set forth, such as the iron oxide and the cobalt nickel platings, are suitable.

Further depression of the image forming temperature may be effected and the region of operation accurately adjusted if the plates 50 and 52 are, in addition, immersed in an A. C. field of chosen size during exposure. It will be noted that the embodiment just described results in a positive latent image in contrast to the other embodiments of Figures 1, 2 and 3 which produce negative latent images.

Further variations will become apparent from the foregoing discussion. Thus, it should be noted that the various embodiments of the present invention described above have been directed toward structures wherein copy containing intelligence to be reproduced is placed in contact with the magnetic printing plate in a manner analogous to that employed in "contact" printing applications. Techniques analogous to "projection" printing may similarly be employed, in which the copy is disposed at a distance from the magnetic plate; and in this latter form of the present invention a pattern of heat gradients can once more be effected by impressing heat from a source, via said copy, onto the printing plate inasmuch as printed portions of the copy will, as has been discussed, absorb heat to a greater extent than unprinted portions.

It should further be noted that, under some circumstances of operation and provided the heat source is impressed upon the plate via the said copy for a sufficient length of time, the printed portions of said copy may rise to a higher temperature than unprinted portions of the said copy due to the cumulative absorption of radiant energy. In certain applications this heat differential in the copy itself may be utilized to effect the selective magnetization or demagnetization of portions of the printing plate in the manner described; and such considerations may be especialy pertinent when the "contact" forms of the invention are employed.

All such possible variations in operation are contemplated by the various forms of structures described, since these structures are directed primarily to the novel generic concept of effecting a pattern of heat gradients upon a magnetic printing surface by the impressing of heat, via copy, to that surface. It is immaterial to this generic concept whether the heat gradients so produced are effected by printed portions of copy rising to a higher temperature than unprinted portions thereof; or, in the alternative, by unprinted portions of the copy permitting greater quantities of heat to be transmitted than printed portions of the copy. The only requirement in this respect is that the copy be such that heat impressed upon the printing plate via the said copy is applied to the said plate in a pattern of gradients corresponding to the intelligence on the copy.

In this latter respect it should further be noted that in some circumstances of operation, transparent copy, i. e. the unprinted portions of the copy are transparent while printed portions are substantially opaque, may give better printing definition and may effect more pronounced heat differentials than in the case of translucent copy. Translucent copy nevertheless operates to effect the desired pattern of heat gradients with good accuracy of reproduction; and accordingly, the present invention contemplates the utilization of both forms of copy.

Other variations will be suggested to those skilled in the art, and it must, therefore, be stressed that the foregoing discussion is meant to be illustrative only and should not be considered limitative of our invention. All such modifications as are in accord with the principles discussed, are meant to fall within the scope of the appended claims.

Having thus described our invention, we claim:

1. The method of preparing a latent magnetic image which comprises the steps of substantially uniformly magnetizing a printing surface, and thereafter selectively heating portions of said surface thereby to demagnetize said portions in accordance with intelligence to be reproduced.

2. The method of preparing a printing surface which comprises applying a pattern of heat gradients to a uniformly magnetized surface thereby to selectively demagnetize portions of said surface in accordance with intelligence to be reproduced.

3. The method of claim 2 including the further step of applying a magnetic ink to said surface subsequent to said selective demagnetization.

4. The method of preparing a printing surface which comprises projecting heat, through copy to be reproduced, onto a magnetized surface thereby to selectively demagnetize portions of said surface in accordance with intelligence on said copy.

5. The method of preparing a printing surface which comprises biasing a substantially uniformly magnetized surface to an operating condition approaching demagnetization, and applying a pattern of heat gradients to said surface in accordance with intelligence to be reproduced whereby said bias and heat gradients coact to demagnetize selected portions of said surface.

6. The method of claim 5 wherein said biasing step comprises heating said magnetized surface to a temperature adjacent to but below the Curie point of the magnetic material comprising said surface.

7. The method of claim 5 wherein said biasing step comprises applying an A. C. erasing field to said magnetized surface of insufficient magnitude to erase said surface at a preselected reference temperature.

8. The method of preparing a printing surface which comprises biasing a magnetic surface to an operating condition approaching uniform magnetization, and applying a pattern of heat gradients to said surface in accordance with intelligence to be reproduced whereby said bias and heat gradients coact to magnetize selected portions of said surface.

9. The method of preparing a printing surface which comprises the steps of applying a magnetic field to a magnetic surface, superposing copy to be reproduced on said surface, and variably projecting heat through said copy onto said surface thereby to selectively alter the magnetization state at portions of said surface in accordance with intelligence on said copy.

10. The method of claim 9 wherein said magnetic field serves to pre-magnetize said surface uniformly, whereby said projected heat selectively de-magnetizes said portions of said surface.

11. The method of claim 9 wherein said magnetic field is of insufficient strength to magnetize said surface permanently, whereby said magnetic field and said heat gradients coact to selectively magnetize said portions of said surface.

12. The method of preparing a printing surface which comprises the steps of impressing an energy bias on a magnetic surface for causing said surface to operate at an operating point approaching a predetermined state of magnetization, impressing a pattern of heat gradients onto said surface thereby to selectively effect said predetermined state of magnetization at portions of said surface, and thereafter removing said energy bias from said surface.

13. The method of claim 12 wherein said step of impressing a pattern of heat gradients comprises projecting radiant heat through copy to be reproduced onto said surface.

14. The method of claim 12 wherein said step of impressing an energy bias on said surface comprises applying an A. C. erasing field to said surface.

15. The method of preparing a printing surface which comprises the steps of impressing an energy bias on a magnetic surface during a first time interval for causing said surface to operate at an operating point approaching a predetermined state of magnetization during said first time interval, and impressing a pattern of heat gradients onto said surface during a second time interval shorter than said first time interval thereby to selectively effect said predetermined state of magnetization at portions of said surface, said second time interval commencing subsequent to commencement of said first time interval, and said first and second time intervals terminating substantially simultaneously.

16. The method of preparing a printing surface which comprises the steps of applying a biasing magnetic field to a magnetic surface for causing said surface to operate at an operating point approaching a predetermined state of magnetization, thereafter applying a pattern of heat gradients to said surface thereby to effect said predetermined state of magnetization at portions of said surface, and subsequently removing said biasing field and said pattern of heat gradients from said surface substantially simultaneously.

17. A printer comprising a surface of magnetic material, copy to be reproduced superposed on said surface, and heating means for projecting heat through said copy onto said surface for selectively changing the state of magnetization at portions of said surface thereby to produce a pattern of magnetic gradients on said surface corresponding to intelligence on said copy.

18. The printer of claim 17 wherein said heating means comprises an infra-red lamp.

19. The printer of claim 17 wherein said surface is uniformly pre-magnetized and said magnetic material has a relatively low Curie point, and thermal bias means adjacent said surface for heating said surface to a temperature slightly below said Curie point.

20. The printer of claim 17 wherein said surface is uniformly pre-magnetized, means producing an A. C. erasing field adjacent said surface, said field being of insufficient magnitude to erase said surface at the ambient temperature of said surface, said heating means being adapted to heat preselected portions of said surface thereby to lower the coercive points of said predetermined portions whereby said erasing field becomes effective in erasing said predetermined portions.

21. The printer of claim 17 including means applying a magnetic bias to said surface, said bias being of insufficient strength to magnetize said surface permanently, whereby said heating means and said bias means coact to selectively magnetize said portions of said surface.

22. A printer comprising a surface of magnetic material, means substantially uniformly magnetizing said surface, and means projecting a pattern of heat gradients, corresponding to intelligence to be reproduced, onto said uniformly magnetized surface thereby to selectively demagnetize portions of said magnetized surface.

23. The printer of claim 22 wherein said means projecting said pattern of heat gradients comprises an infrared lamp, and a sheet of variably heat translucent copy interposed between said lamp and said surface.

24. The printer of claim 22 including a shutter between said surface and said projecting means whereby said pattern of heat gradients is projected onto said surface during a time interval defined by the opening of said shutter.

25. A printer comprising a uniformly magnetized surface of magnetic material, means selectively producing an A. C. erasing field in said surface, the magnitude of said field being normally insufficient to demagnetize said surface, means selectively applying a pattern of heat gradients to said surface whereby said heat gradients and said erasing field may coact to demagnetize portions of said surface in accordance with intelligence to be reproduced, and control means for selectively applying said erasing field and said heat gradients to said surface and for thereafter selectively removing said field and gradients from said surface.

26. The combination of claim 25 wherein said control means comprises pulsing means for operatively applying said field to said surface during a first time interval, said pulsing means being operative to apply said heat gradients to said surface during a second time interval commencing subsequent to commencement of said first time interval and terminating substantially simultaneously with termination of said first time interval.

27. The combination of claim 26 wherein said means applying a pattern of heat gradients comprises a source of heat, a shutter between said source and said surface, and copy between said source and said surface, said pulsing means being operative to open said shutter for said second time interval whereby heat from said source may be impressed on said surface via said copy.

References Cited in the file of this patent

UNITED STATES PATENTS 2,693,416 Butterfield ............... Nov. 2, 1954

OTHER REFERENCES

Berry et al.: "Ferromagnetography-High Speed," General Electric Review, July 1952, pp. 20, 21, 22 and 61.